(12) United States Patent
Draper et al.

(10) Patent No.: US 7,568,911 B1
(45) Date of Patent: Aug. 4, 2009

(54) CAMPING STOVE WITH PREHEAT SYSTEM

(76) Inventors: Diana Clifton Draper, 9516 Lake Dr., New Port Richey, FL (US) 34654; George E. Draper, Jr., 9516 Lake Dr., New Port Richey, FL (US) 34654

(*) Notice: Subject to any disclaimer, the term of this patent is extended or adjusted under 35 U.S.C. 154(b) by 865 days.

(21) Appl. No.: 11/043,555

(22) Filed: Jan. 26, 2005

Related U.S. Application Data (63) Continuation-in-part of application No. 10/606,688, filed on Jun. 26, 2003, now Pat. No. 6,887,071, which is a continuation-in-part of application No. 10/389,896, filed on Mar. 17, 2003, now Pat. No. 6,688,877, application No. 11/043,555, which is a continuation-in-part of application No. 10/606,695, filed on Jun. 26, 2003, now Pat. No. 6,883,526, which is a continuation-in-part of application No. 10/389,896.

(51) Int. Cl.
*F23D 11/44* (2006.01)
*F23D 22/00* (2006.01)
*F23C 99/00* (2006.01)

(52) U.S. Cl. .................. 431/231; 431/11; 431/232; 431/236; 431/237; 431/344; 431/278; 126/39 R; 126/40; 126/44

(58) Field of Classification Search .................. 431/11, 431/36, 37, 104, 230, 231, 232, 233, 235, 431/236, 238, 239, 278, 285, 344; 126/39 R, 126/40, 44
See application file for complete search history.

(56) References Cited

U.S. PATENT DOCUMENTS

| | | | | |
|---|---|---|---|---|
| 457,934 A | * | 8/1891 | Craig | 431/231 |
| 935,639 A | * | 10/1909 | Chiesanova | 126/40 |
| 936,815 A | * | 10/1909 | Schemnitz | 126/240 |
| 954,703 A | * | 4/1910 | Savage et al. | 126/38 |
| 1,502,974 A | * | 7/1924 | Aronson | 431/141 |
| 1,947,194 A | * | 2/1934 | Engh | 431/231 |
| 2,139,819 A | * | 12/1938 | Graetz | 431/249 |
| 2,263,659 A | * | 11/1941 | Tullis | 362/179 |
| 2,285,689 A | * | 6/1942 | Tullis | 239/434 |
| 2,325,077 A | * | 7/1943 | Robinson | 126/38 |
| 2,402,138 A | * | 6/1946 | Hebard | 239/116 |
| 2,676,846 A | * | 4/1954 | Loose | 239/396 |
| 2,717,607 A | * | 9/1955 | Rogers | 131/175 |
| 3,804,075 A | * | 4/1974 | Rummel | 126/258 |
| 4,392,819 A | * | 7/1983 | Ahn | 431/231 |

(Continued)

FOREIGN PATENT DOCUMENTS

GB     2262599 A   *   6/1993

*Primary Examiner*—Carl D Price
(74) *Attorney, Agent, or Firm*—Edward P Dutkiewicz (57) ABSTRACT

A stove has a fuel tank with a flat top and bottom and a side wall to define a fuel chamber. A fuel feed path includes a vertical pipe assembly. The fuel feed path also includes a horizontal pipe assembly functioning as a vaporizer. The fuel feed path also includes a generally C-shaped pipe assembly. An associated warming coil is in a generally circular configuration to direct a flow of some of the fuel from one part of the horizontal pipe assembly to another part of the horizontal pipe assembly. A generally cylindrical ignition chamber is at the terminal end of the C-shaped pipe assembly. Apertures are provided for cooking purposes and are adapted to preheat the fuel in the horizontal pipe assembly and the warming coil.

10 Claims, 4 Drawing Sheets

U.S. PATENT DOCUMENTS

| | | | |
|---|---|---|---|
| 4,491,251 A * | 1/1985 | Pratz et al. | 222/469 |
| 4,734,029 A * | 3/1988 | Newman | 431/211 |
| 4,954,075 A * | 9/1990 | Francino | 431/107 |
| 5,417,565 A * | 5/1995 | Long | 431/231 |
| D389,257 S * | 1/1998 | Eca et al. | D26/37 |
| 5,836,757 A * | 11/1998 | Long et al. | 431/264 |
| 6,688,877 B1 * | 2/2004 | Draper et al. | 431/104 |

* cited by examiner

CAMPING STOVE WITH PREHEAT SYSTEM

RELATED APPLICATIONS

The present application is a continuation-in-part application of U.S. patent Ser. No. 10/606,688 now U.S. Pat. No. 6,887,071, issued on May 3, 2005 and Ser. No. 10/606,695 now U.S. Pat. No. 6,883,526, issued on Mar. 8, 2005 both filed Jun. 26, 2003, which are in turn continuation-in-part applications of U.S. patent Ser. No. 10/389,896, filed Mar. 17, 2003, now U.S. Pat. No. 6,688,877, the subject matter of which three applications is incorporated hereon by reference.

BACKGROUND OF THE INVENTION

1. Field of the Invention

The present invention relates to a camping stove with preheat system and more particularly pertains to featuring a path which feeds the fuel past the pilot flame and the heating flame for preheat purposes.

2. Description of the Prior Art

The use of camping stoves of known designs and configurations is known in the prior art. More specifically, camping stoves of known designs and configurations previously devised and utilized for the purpose of heating food while camping through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,773,458 to Spotts discloses a portable convertible mantle-lantern, camp stove. U.S. Pat. No. 3,804,075 to Rummel discloses attachments for lanterns. U.S. Pat. No. 4,029,079 to Elder discloses a lantern stove device attachment. U.S. Pat. No. 4,372,198 discloses a lantern hot plate. U.S. Pat. No. 4,091,795 discloses a cooking adapter. U.S. Pat. No. 4,954,075 discloses a lantern head for backpacker's stove. U.S. Pat. No. 5,113,843 to Henry et al. discloses a combustion device for stoves and fireplaces. Lastly, U.S. Pat. No. 6,439,223 issued Aug. 27, 2002, to Draper et al. discloses a lantern system.

While these devices fulfill their respective, particular objectives and requirements, the aforementioned patents do not describe camping stove with preheat system that allows featuring a path which feeds the fuel past the pilot flame and the heating flame for preheat purposes.

In this respect, the camping stove with preheat system according to the present invention substantially departs from the conventional concepts and designs of the prior art, and in doing so provides an apparatus primarily developed for the purpose of featuring a path which feeds the fuel past the pilot flame and the heating flame for preheat purposes.

Therefore, it can be appreciated that there exists a continuing need for a new and improved camping stove with preheat system which can be used for featuring a path which feeds the fuel past the pilot flame and the heating flame for preheat purposes. In this regard, the present invention substantially fulfills this need.

SUMMARY OF THE INVENTION

In view of the foregoing disadvantages inherent in the known types of camping stoves of known designs and configurations now present in the prior art, the present invention provides an improved camping stove with preheat system. As such, the general purpose of the present invention, which will be described subsequently in greater detail, is to provide a new and improved camping stove with preheat system and method which has all the advantages of the prior art and none of the disadvantages.

To attain this, the present invention essentially comprises a stove. The stove has a fuel tank. The fuel tank has an essentially flat top and an essentially flat bottom. The bottom is parallel with the top. The fuel tank has an essentially cylindrical side wall between the top and bottom. In this manner an interior fuel chamber is defined for the receipt of fuel to be burned by the stove during operation and use. The top has a plurality of rotationally spaced holes in proximity to the side wall. The plurality of holes includes a fuel hole, a pilot hole 28 and a gauge hole. The side wall has a pump hole.

A fuel feed path is provided. The fuel path includes a vertical pipe assembly. The pipe assembly functions as a riser beginning in the fuel chamber to an elevation above the top of the fuel tank. The fuel feed path also includes a horizontal pipe assembly. The pipe assembly functions as a vaporizer beginning at the top of the vertical pipe assembly and extending across the middle of the top of the fuel tank. The fuel feed path also includes a generally C-shaped pipe assembly. The pipe assembly begins at the end of the horizontal pipe assembly and terminates in proximity to the center of the fuel tank between the horizontal pipe assembly and the top wall of the fuel tank. An air hole is provided through the fuel tank. The horizontal pipe assembly also has an associated warming coil. The warming coil is in a generally circular configuration to direct a flow of some of the fuel from one part of the horizontal pipe assembly to another part of the horizontal pipe assembly.

Provided next is a generally cylindrical ignition chamber at the terminal end of the C-shaped pipe assembly. A spacer is provided beneath the ignition chamber. A bolt positions the ignition chamber and spacer above the center of the fuel tank. A lower plate is provided. The lower plate is located above the spacer and beneath the ignition chamber. An upper plate is provided. The upper plate is located in proximity to the ignition chamber. The ignition chamber has apertures above the upper plate for cooking purposes and adapted to preheat the fuel in the horizontal pipe assembly and the warming coil. The warming coil and the ignition chamber and the two plates are essentially coaxial.

A valve assembly is provided next. The valve assembly has an elongated rod. The rod has a handle. The handle is at one end exterior of the horizontal pipe assembly. The rod has a needle. The needle is provided at the other end. The rod has screw threads. The screw threads are provided intermediate of the ends. The needle is adapted to move between an advanced orientation to preclude the flow of fuel to the ignition chamber and a retracted orientation to allow the flow of fuel to the ignition chamber. The handle is adapted to be rotated by a user whereby the threads will control the orientation of the needle and the extent of the fuel fed and the heat output of the stove.

Provided next is a pilot assembly. The pilot assembly includes a pilot tube. The pilot tube has a lower end. The lower end extends from within the fuel chamber. The pilot tube has an upper end. The upper end is at a location above the top of the fuel tank. The pilot assembly also includes an inverted L-shaped tube. The tube extends from the top of the pilot tube and terminates in proximity to the horizontal tube assembly and the warming coil. The pilot assembly also includes a pivotable controller. The pivotable controller is adapted to be pivoted between a first position in response to a spring force to close off the flow of fuel and a second position in response to a downward force by a user's thumb to activate the pilot and preheat the fuel.

A pressure gauge is provided. The pressure gauge is secured to the fuel tank at the fuel hole to determine the pressure within the fuel tank.

Further provided is a pressure pump. The pressure pump is secured to the fuel tank at the gauge hole to determine the increase the pressure within the fuel tank.

Provided last is a support assembly. The support assembly has a lower ring. The lower ring is positionable around the bottom of the fuel tank. The support assembly also has an upper ring. The support assembly has a grid platform. The grid platform is positionable above the stove. The support assembly has spacer struts. In this manner the system is adapted to support food to be heated at a location above a flame generated by the stove.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved camping stove with preheat system which has all of the advantages of the prior art camping stoves of known designs and configurations and none of the disadvantages.

It is another object of the present invention to provide a new and improved camping stove with preheat system which may be easily and efficiently manufactured and marketed.

It is further object of the present invention to provide a new and improved camping stove with preheat system which is of durable and reliable constructions.

An even further object of the present invention is to provide a new and improved camping stove with preheat system which is susceptible of a low cost of manufacture with regard to both materials and labor, and which accordingly is then susceptible of low prices of sale to the consuming public, thereby making such camping stove with preheat system economically available to the buying public.

Even still another object of the present invention is to provide a camping stove with preheat system for featuring a path which feeds the fuel past the pilot flame and the heating flame for preheat purposes.

Lastly, it is an object of the present invention to provide a new and improved camping stove with preheat system. A stove has a fuel tank with a flat top and bottom and a side wall to define a fuel chamber. A fuel feed path includes a vertical pipe assembly. The fuel feed path also includes a horizontal pipe assembly functioning as a vaporizer. The fuel feed path also includes a generally C-shaped pipe assembly. An associated warming coil is in a generally circular configuration to direct a flow of some of the fuel from one part of the horizontal pipe assembly to another part of the horizontal pipe assembly. A generally cylindrical ignition chamber is at the terminal end of the C-shaped pipe assembly. Apertures are provided for cooking purposes and are adapted to preheat the fuel in the horizontal pipe assembly and the warming coil.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
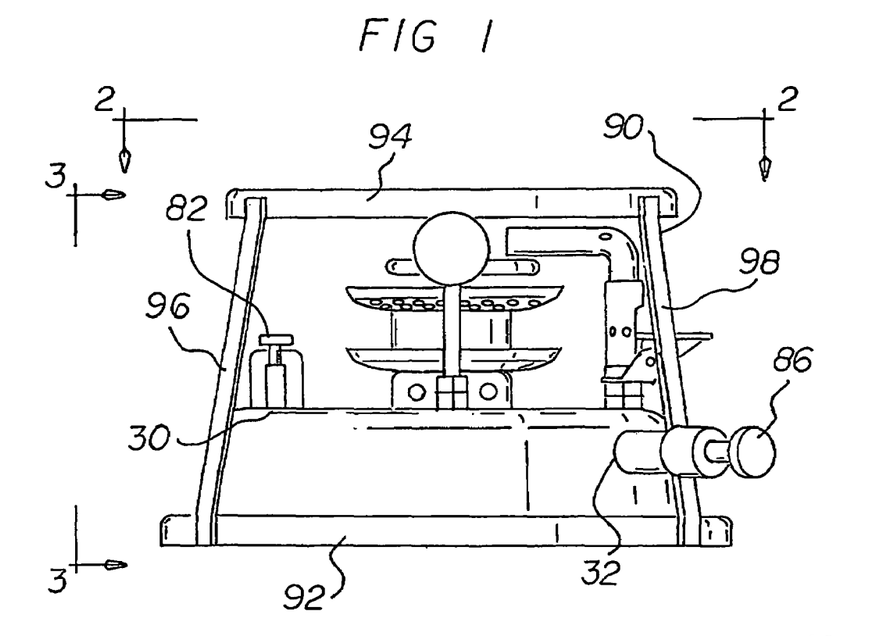
FIG. 1 is a side elevational view of a camping stove with preheat system constructed in accordance with the principles of the present invention.

With reference now to the drawings, and in particular to FIG. 1 thereof, the preferred embodiment of the new and improved camping stove with preheat system embodying the principles and concepts of the present invention and generally designated by the reference numeral 10 will be described.

The present invention, the camping stove with preheat system 10 is comprised of a plurality of components. Such components in their broadest context include a stove, a fuel feed path, and an ignition chamber. Such components are individually configured and correlated with respect to each other so as to attain the desired objective.

First provided is a stove 14. The stove has a fuel tank 16 for fuel, preferably methane. The fuel tank has an essentially flat top 18 and an essentially flat bottom 20. The bottom is parallel with the top. The fuel tank has an essentially cylindrical side wall 22 between the top and bottom. In this manner an interior fuel chamber 24 is defined for the receipt of fuel to be burned by the stove during operation and use. The top has a plurality of spaced holes in proximity to the side wall. The holes are spaced circumferentially on, and positioned adjacent an outer perimeter of the flat top in proximity to the side wall. The plurality of holes includes a fuel hole 26, a pilot hole 28 and a gauge hole 30. The side wall has a pump hole 32.

Figure 3:
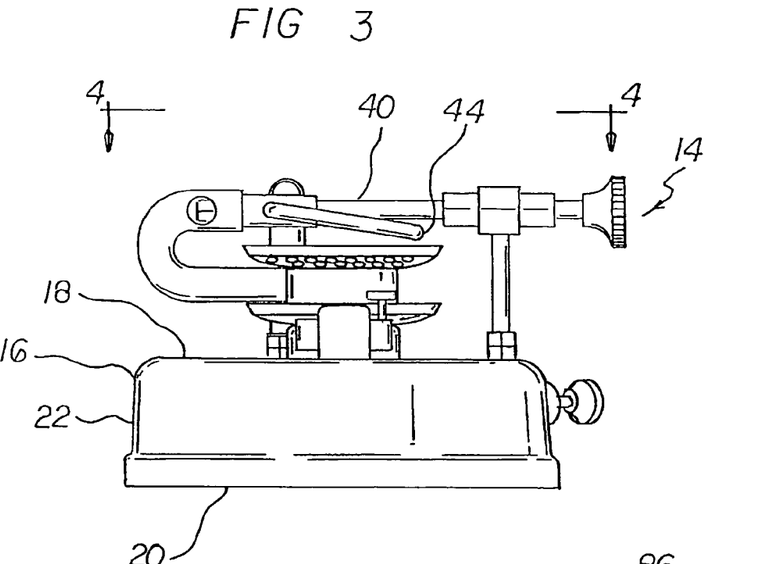
FIG. 3 is a side elevational view of the stove taken along line 3-3 of FIG. 1.
Figure 4:
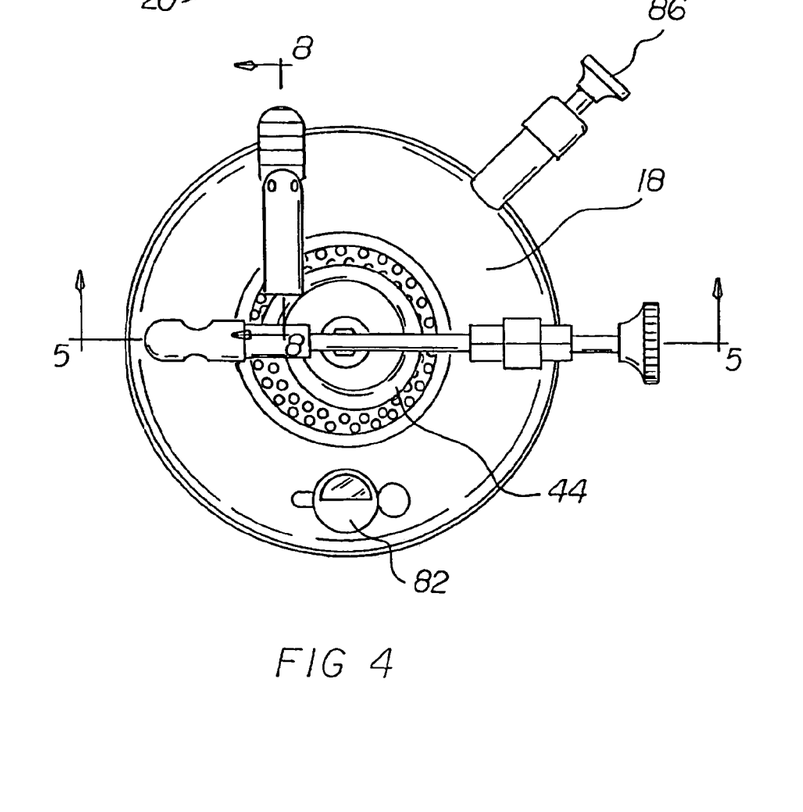
FIG. 4 is a plan view of the stove taken along line 4-4 of FIG. 3.
Figure 5:
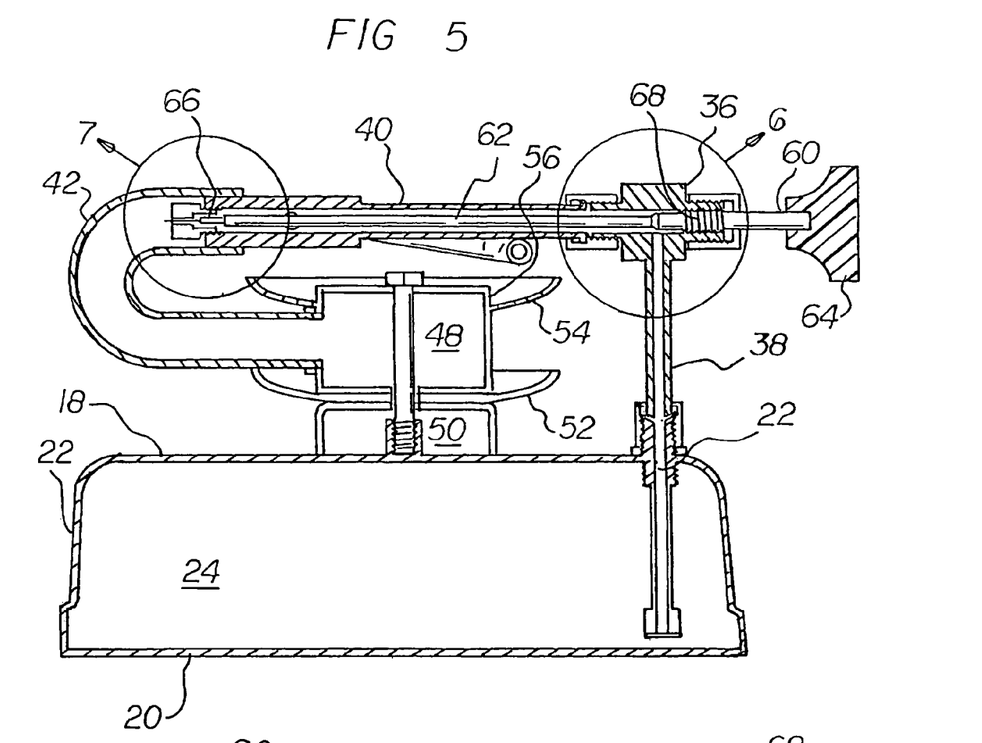
FIG. 5 is a cross sectional view of the stove taken along line 5-5 of FIG. 4.
Figure 6:
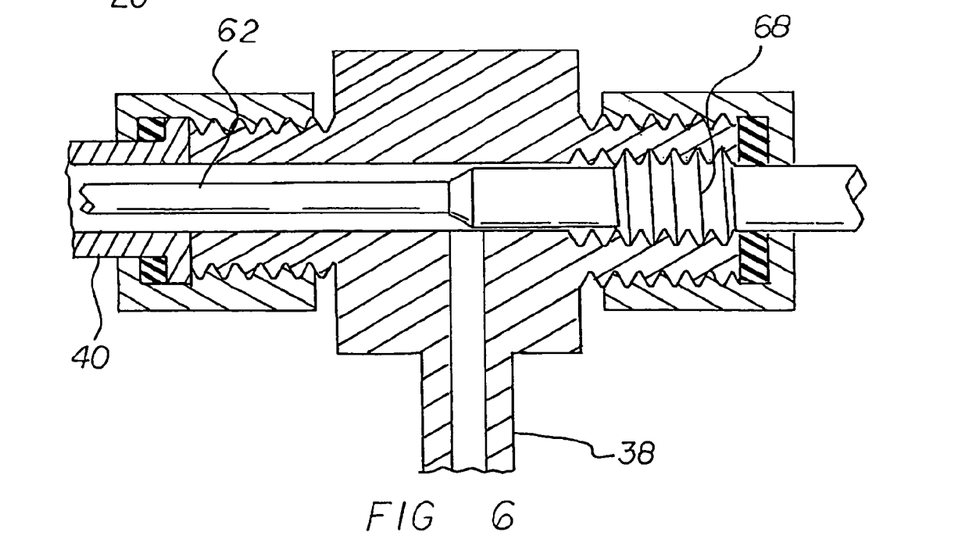
FIG. 6 is an enlarged sectional view taken at circle 6 of FIG. 5.
Figure 7:
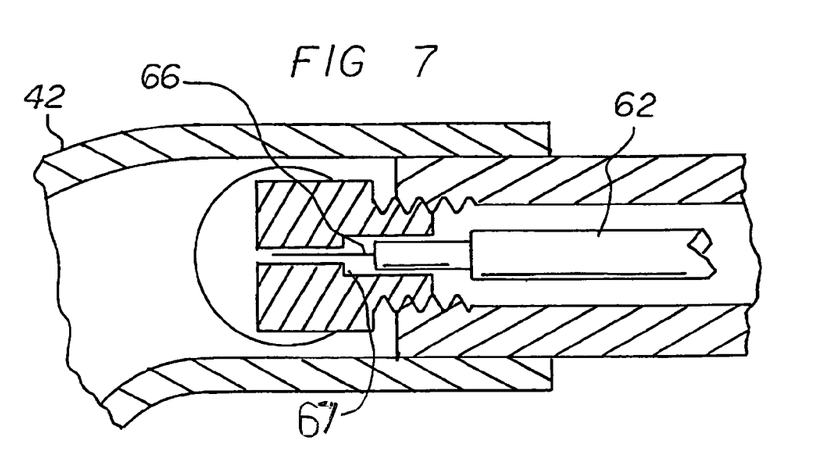
FIG. 7 is an enlarged sectional view taken at circle 7 of FIG. 5.

A fuel feed path 36 is provided. The fuel path includes a vertical pipe assembly 38. The pipe assembly functions as a riser beginning in the fuel chamber to an elevation above the top of the fuel tank. The fuel feed path also includes a horizontal pipe assembly 40. The pipe assembly functions as a vaporizer beginning at the top of the vertical pipe assembly and extending across the middle of the top of the fuel tank. The fuel feed path also includes a generally C-shaped pipe assembly 42. The pipe assembly begins at the end of the horizontal pipe assembly and terminates in proximity to the center of the fuel tank between the horizontal pipe assembly and the top wall of the fuel tank. The horizontal pipe assembly also has an associated warming coil 44. The warming coil is in a generally circular configuration to direct a flow of some of the fuel from one part of the horizontal pipe assembly to another part of the horizontal pipe assembly for preheat purposes. The warming coil couples with the fuel feed path, and is operationally Parallel with the fuel feed path, in that the warming coil takes some of the fuel from the fuel feed path, heats the fuel above the ignition chamber, and returns the fuel to the fuel feed path, as shown in FIGS. 3, 4, and 5.

Figure 2:
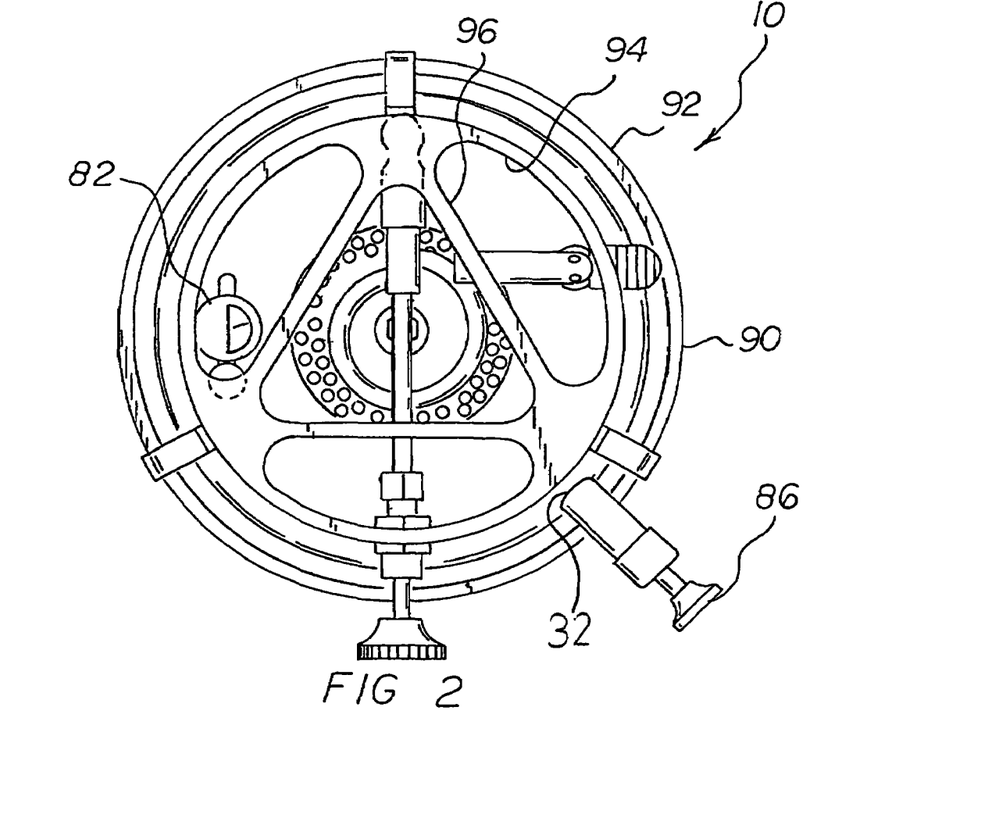
FIG. 2 is a plan view of the system taken along line 2-2 of FIG. 1.

Provided next is a generally cylindrical ignition chamber 48 at the terminal end of the C-shaped pipe assembly. The ignition chamber has a periphery and a top and a bottom. A spacer 50 is provided beneath the bottom of the ignition chamber. A bolt positions the ignition chamber and spacer above the center of the fuel tank. A lower plate 52 is provided. The lower plate is located above the spacer and beneath the ignition chamber. An upper plate 54 is provided. The upper plate is located in proximity to the ignition chamber. The ignition chamber has apertures 56 in the periphery of the ignition chamber above the upper plate, as shown in FIG. 5. The apertures are for cooking purposes and positioned so as to allow the heat within the ignition chamber to preheat the fuel in the horizontal pipe assembly and the warming coil. As can bee seen in FIG. 2, the apertures of the ignition chamber from a generally circular pattern having an inside area, with the circular pattern having an outside edge. The warming coil is entirely located within the area of the upper plate defined by the inner area and outside edge of the upper plate of the burning chamber. The warming coil and the ignition chamber and the two plates are essentially coaxial.

A valve assembly 60 is provided next. The valve assembly has an elongated rod 62. The rod has a handle 64. The handle is at one end exterior of the horizontal pipe assembly. The rod has a needle 66. The needle is provided at the other end. Adjacent the needle is the valve seat 67 located so that the rod may contact the valve seat, thereby precluding the flow of fuel or the needle may have a space between the needle and the valve seat thereby allowing the flow of fuel through the valve seat. The rod has screw threads 68. The screw threads are provided intermediate of the ends. The needle is adapted to move between an advanced orientation to preclude the flow of fuel to the ignition chamber and a retracted orientation to allow the flow of fuel to the ignition chamber. The handle is adapted to be rotated by a user whereby the threads will control the advancement and retraction along with the orientation of the needle and the extent of the fuel fed and the heat output of the stove.

Figure 8:
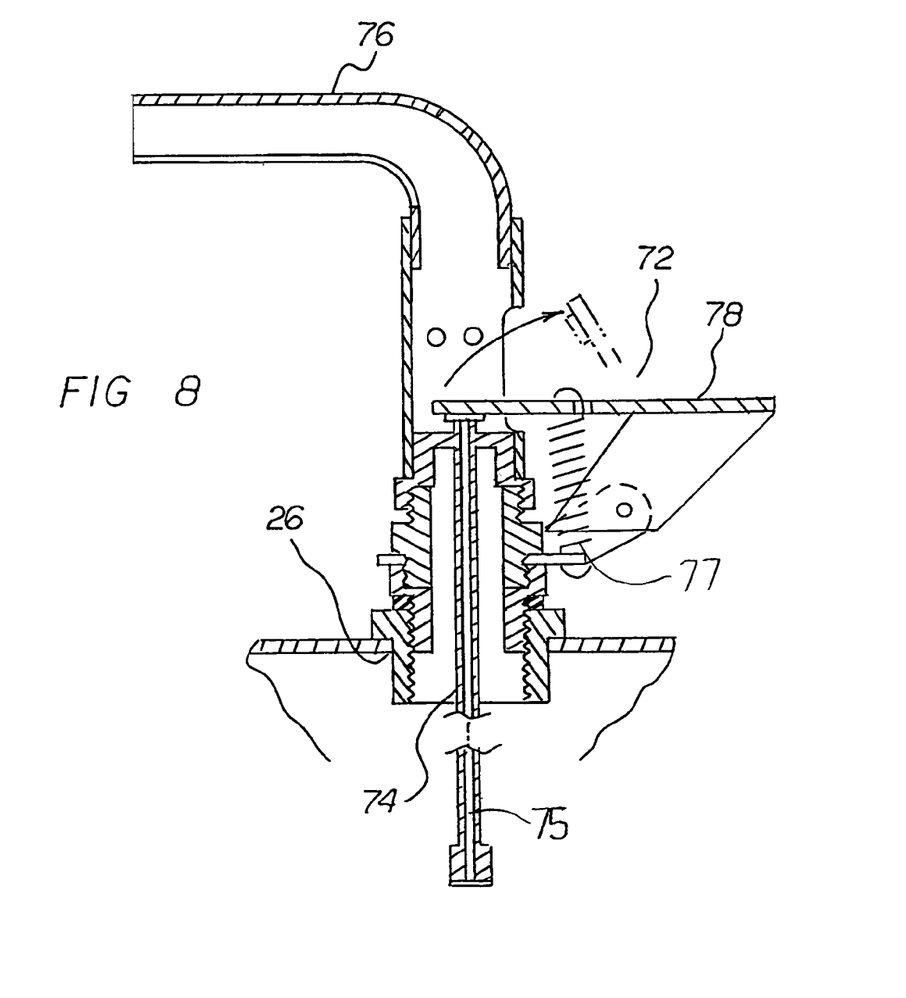
FIG. 8 is a cross sectional view of the stove taken along line 8-8 of FIG. 4.

Provided next is a pilot assembly 72. The pilot assembly includes a pilot tube 74. The pilot tube has a lower end forming a fuel inlet into the pilot tube when in position within the fuel tank. The pilot tube having an upper end at a location above the top of the fuel tank forming an end flame port, with a fuel passageway 75 running through the pilot tube, the fuel Passageway allowing fuel to run from the tank to the flame port of the pilot tube. The lower end extends from within the fuel chamber. The upper end is at a location above the top of the fuel tank. The pilot assembly also includes an inverted L-shaped tube 76. The tube extends from the top of the pilot tube and terminates in proximity to the horizontal tube assembly and the warming coil with a controller hole there through. The pilot assembly also includes a pivotable controller 78 extending through the controller hole, with the controller having an associated spring 77 to bias the controller in an occluding position relative to the pilot tube, as shown in FIG. 8. The pivotable controller is configured to be pivoted between a first position in response to a spring force of the spring to close off the flow of fuel by occlusion of the pilot tube, and a second position in response to a downward force by a user's thumb to activate the pilot and preheat the fuel. FIG. 8 shows the controller 78 in a solid line configuration spring urged to close off the flow of pilot fuel. The broken line configuration shows the controlled depressed by a thumb of the user against the urging of the spring to allow the flow of pilot fuel in order to light the stove and preheat the fuel.

A pressure gauge 82 is provided. The pressure gauge is secured to the fuel tank at the fuel hole to determine the pressure within the fuel tank.

Further provided is a pressure pump. The pressure pump is secured to the fuel tank and communicates with the fuel tank, at the pump hole to increase the pressure within the fuel tank.

Provided last is a support assembly 90. The support assembly has a lower ring 92. The lower ring is positionable around the bottom of the fuel tank. The support assembly also has an upper ring 94. The support assembly has a grid platform 96. The grid platform is positionable above the stove. The support assembly has spacer struts 98. In this manner the system is adapted to support food to be heated at a location above a flame generated by the stove.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A camping stove with preheat system featuring a path which feeds a fuel past a pilot flame and a heating flame for preheat purposes comprising, in combination:

a stove having a fuel tank, the fuel tank having an essentially flat top with an essentially flat bottom parallel with the top and an essentially cylindrical side wall there between to define an interior fuel chamber for the receipt of fuel to be burned by the stove during operation and use, the top having a plurality of circumferentially spaced holes on the an outer perimeter area of the flat top and in proximity to the side wall including a fuel hole and a pilot hole and a gauge hole, the side wall having a pump hole;

a fuel feed path including a vertical pipe assembly functioning as a riser beginning in the fuel chamber to an elevation above the top of the fuel tank, the fuel feed path also including a horizontal pipe assembly functioning as a vaporizer beginning at a top of the vertical pipe assembly and extending across a middle of the top of the fuel tank, the fuel feed path also including a generally C-shaped pipe assembly beginning at an end of the horizontal pipe assembly and terminating in proximity to a center of the fuel tank between the horizontal pipe assembly and the top wall of the fuel tank, the horizontal pipe assembly also having an associated warming coil in a generally circular configuration the warming coil being operationally parallel oriented to the horizontal pipe assembly so as to direct a flow of some of the fuel from one part of the horizontal pipe assembly over a burner to another part of the horizontal pipe assembly;

a generally cylindrical ignition chamber at a terminal end of the C-shaped pipe assembly with a spacer beneath the ignition chamber and a bolt positioning the ignition chamber and spacer above the center of the fuel tank, a lower plate located above the spacer and beneath the ignition chamber and an upper plate located in proximity to the ignition chamber, the ignition chamber having apertures located above the upper plate, said apertures being arranged to produce flames for cooking purposes and wherein said flames are positioned with respect to the horizontal pipe assembly and the warming coil so as to preheat the fuel flowing to the burner chamber from the fuel tank and through the horizontal pipe assembly and the warming coil, and wherein the warming coil and the ignition chamber and the lower plate and the upper plate being essentially coaxial;

a valve assembly having an elongated rod with a handle at one end exterior of the horizontal pipe assembly and a needle at an other end and screw threads intermediate thereof, the needle adapted to move between an advanced orientation to preclude the flow of fuel to the ignition chamber by contact of the rod with a valve seat, and a retracted orientation to allow the flow of fuel to the ignition chamber through the valve seat, the handle adapted to be rotated by a user whereby the threads will control the orientation of the needle and the extent of the fuel fed and the heat output of the stove;

a pilot assembly passing through the pilot hole of the flat top of the fuel tank, the pilot assembly including a pilot tube having a lower end extending from within the fuel chamber forming a fuel inlet into the passageway of the pilot tube, and the pilot tube having an upper end at a location above the top of the fuel tank forming an end flame port with a fuel passageway through the pilot tube, the pilot assembly also including an inverted L-shaped tube extending proximally from the upper end of the pilot tube the L-shaped tube thereby communicating with an air inlet aperture and a fuel nozzle which is regulated by a pivotal controller, the L-shaped tube then terminating distally in proximity to the horizontal tube assembly and the warming coil, the L-shaped tube distally there defining a flame port, the pilot assembly also including the pivotable controller having an associated controller spring, the controller being configured to be pivoted between a first position in response to a spring force created by the spring to close off a flow of fuel by occlusion of the pilot tube by the controller and a second position in response to a downward force by a user's thumb to activate the pilot and preheat the fuel, wherein a combustible air and fuel mixture is formed within the pilot tube with the mixture being delivered to the distal end of the L-shaped tube for combustion;

a pressure gauge secured to the fuel tank and communicating with the fuel tank at the fuel hole to determine the pressure within the fuel tank;

a pressure pump secured to the fuel tank at the pump hole to increase the pressure within the fuel tank; and a support assembly having a lower ring positionable around the bottom of the fuel tank and an upper ring with a grid platform positionable above the stove with spacer struts there between whereby the system is adapted to support food to be heated at a location above flames generated by the stove.

2. A camping stove with preheat system comprising:

a stove having a fuel tank with an essentially flat top and bottom and a side wall there between to define a fuel chamber, the stove also having an associated ignition chamber;

a fuel feed path including a vertical pipe assembly between the fuel chamber and an elevation above the top of the fuel tank, the fuel feed path also including a horizontal pipe assembly functioning as a vaporizer beginning at a top of the vertical pipe assembly and extending across the fuel tank, the fuel feed path also including a generally C-shaped pipe assembly beginning at an end of the horizontal pipe assembly and terminating in proximity to a center of the fuel tank at the ignition chamber, the fuel feed having an associated warming coil having a generally circular configuration to direct a flow of some of the fuel from one part of the horizontal pipe assembly to another part of the horizontal pipe assembly; and the ignition chamber having a generally cylindrical configuration being located at a terminal end of the C-shaped pipe assembly with apertures for cooking purposes and adapted to preheat the fuel in the horizontal pipe assembly and the warming coil, the fuel feed path beginning within and being continuous with the fuel tank, the warming coil being part of the fuel feed path and operationally parallel with the fuel feed path, the warming coil being located entirely above the ignition chamber.

3. The system as set forth in claim 2 and further including a valve assembly having an elongated rod with a handle at one end exterior of the horizontal pipe assembly and a needle at the other end and screw threads intermediate thereof, the needle adapted to move between an advanced orientation to preclude the flow of fuel to the ignition chamber and a retracted orientation to allow the flow of fuel to the ignition chamber, the handle adapted to be rotated by a user whereby the threads will control the orientation of the needle and the extent of the fuel fed and the heat output of the stove.

4. The system as set forth in claim 2 and further including a pilot assembly including a pilot tube having a lower end extending from within the fuel chamber and having an upper end at a location above the top of the fuel tank, the pilot assembly also including an inverted L-shaped tube extending from the upper end of the pilot tube and terminating in proximity to the horizontal tube assembly and the warming coil, the pilot assembly also including a pivotable controller adapted to be pivoted between a first position in response to a spring force to close off the flow of fuel and a second position in response to a downward force by a user's thumb to activate the pilot and preheat the fuel.

5. The system as set forth in claim 2 and further including a pressure gauge secured to the fuel tank at the fuel hole to determine the pressure within the fuel tank.

6. The system as set forth in claim 2 and further including a pressure pump secured to the fuel tank at the gauge hole to determine the increase the pressure within the fuel tank.

7. The system as set forth in claim 2 and further including a support assembly having a lower ring positionable around the bottom of the fuel tank and an upper ring with a grid platform positionable above the stove with spacer struts there between whereby the system is adapted to support food to be heated at a location above a flame generated by the stove.

8. The system as set forth in claim 2 wherein the fuel is methane.

9. A camping stove with preheat system comprising:

a stove having a fuel tank, the tank having a top;

a fuel path beginning within and being continuous with the fuel tank, the fuel path having at least one generally circular warming vaporizer coil operationally coupled there to, the coil being located operationally parallel with the fuel feed path;

an ignition upper plate coupled to the fuel tank top having a generally circular aperture pattern having an inside area, with the circular pattern also having an outside edge;

a horizontal tubular C-shaped pipe associated with the fuel path, the horizontal C-shaped pipe having a central portion and a periphery with there being an air draw hole along the periphery of the horizontal C-shaped pipe; and the warming vaporizer coil being coupled to the horizontal tubular C-shaped pipe, the warming coil being entirely located within the area above the ignition upper plate, the area being defined by the inner area and outside edge of the ignition upper plate.

10. The system as set forth in claim 9 wherein the horizontal tubular C-shaped pipe having a curved area with at least one hole associated with the periphery of the curved area.

* * * * *